US006146460A

United States Patent [19]

Poole et al.

[11] Patent Number: 6,146,460

[45] Date of Patent: Nov. 14, 2000

[54] WALLPAPER PREPARATION DEVICE

[76] Inventors: Daniel L. Poole, 3319 W. Malapai Dr., Phoenix, Ariz. 85051; Robert N. Poole, P.O. Box 2898, Pinetop, Ariz. 85935

[21] Appl. No.: 09/083,878

[22] Filed: May 22, 1998

Related U.S. Application Data

[60] Provisional application No. 60/047,553, May 22, 1997, and provisional application No. 60/048,609, Jun. 4, 1997.

[51] Int. Cl.[7] .............................. B05C 1/12; B05C 3/12; B05C 3/20; B65C 11/00; B32B 31/00

[52] U.S. Cl. .......................... 118/245; 118/246; 118/407; 118/429; 118/DIG. 17; 156/524; 156/578

[58] Field of Search .................................... 118/245, 246, 118/263, 407, 415, 429, DIG. 17; 156/524, 574, 575, 576, 577, 578, 549

[56] References Cited

U.S. PATENT DOCUMENTS

| | | | |
|---|---|---|---|
| 30,788 | 11/1860 | Martin | 118/246 |
| 405,044 | 6/1889 | Manahan et al. | 118/246 |
| 455,000 | 6/1891 | Kerbaugh | 156/549 |
| 470,115 | 3/1892 | Feldon | 118/246 |
| 1,265,127 | 5/1918 | Sleeper . | |
| 1,350,789 | 8/1920 | Delany et al. | 118/246 |
| 1,507,465 | 9/1924 | Collins | 118/246 |
| 1,575,868 | 3/1926 | Roles | 118/246 |
| 1,889,127 | 11/1932 | Mann | 118/246 |
| 2,151,344 | 3/1939 | Barnard . | |
| 2,264,501 | 12/1941 | Beach | 118/246 |
| 4,377,983 | 3/1983 | Skarsten | 118/42 |
| 4,660,502 | 4/1987 | Scott . | |
| 5,330,575 | 7/1994 | Poole et al. . | |
| 5,421,886 | 6/1995 | Poole et al. . | |

*Primary Examiner*—Laura Edwards
*Assistant Examiner*—J. A. Lorengo
*Attorney, Agent, or Firm*—Parsons & Goltry; Robert A. Parsons; Michael W. Goltry

[57] ABSTRACT

A wallpaper preparation device including a tray having a length and defining a reservoir for receiving a fluid for application to wallpaper. A roller rotatably carried by the tray and extending into the reservoir. A retaining member having opposing ends engagable with engagement features formed in opposing ends of the tray on a first side of the roller. The retaining member extends the length of the tray parallel to a surface of the roller with a gap therebetween, for holding the wallpaper against the roller. The retaining member is adjustable to increase and decrease the gap, thereby decreasing and increasing a frictional force between the wallpaper to be prepared and the roller.

13 Claims, 5 Drawing Sheets

WALLPAPER PREPARATION DEVICE

This application claims the benefit of U.S. Provisional Application No. 60/047,553, filed May 22, 1997 and U.S. Provisional Application No. 60/048,609, filed Jun. 4, 1997.

FIELD OF THE INVENTION

The present invention relates to devices for preparing wallpaper.

More particularly, the present invention pertains to devices for preparing wallpaper for application to a wall.

BACKGROUND OF THE INVENTION

The practice of hanging paper on walls has long been observed, and has progressed through a large number of devices intended to simplify and increase the speed and efficiency of paper hanging. Hanging paper essentially consists of extracting a measured length of wallpaper from a roll. The has a pattern or design on the front surface and is typically blank on the back surface. A paste, used to affix the wallpaper to the wall, is applied to the back surface. The length of paper is then applied to the wall, the paste covered side against the surface of the wall.

Different devices have been developed for the different steps in the procedure, some devices combining multiple, or even all of the steps. However, the present device is concerned with the preparation of a length of paper, that is, applying paste to the back surface of a length of wallpaper.

Traditionally, a measured length of paper is cut from a roll, placed pattern side down on a flat surface, the back surface coated with paste using a hand wielded brush. The obvious advantages to this approach is its simplicity and cost effectiveness. There are, however, major drawbacks. Specifically, the paste is very difficult to apply uniformly and of a specific thickness. This procedure is also very time-consuming and can create a mess requiring further time spent in cleaning. A further approach to applying paste to wallpaper is the use of a paste tray through which the paper can be pulled. This can become very messy, and uniform application of paste is very difficult. Also, both sides of the paper are often covered by the paste.

It would be highly advantageous, therefore, to remedy the foregoing and other deficiencies inherent in the prior art.

Accordingly, it is an object of the present invention to provide a new and improved apparatus for applying paste to wallpaper.

Another object of the present invention is to provide a wallpaper paste applying apparatus which applies a uniform coating of paste to wallpaper.

Still another object of the present invention is to provide an apparatus which may be adjusted to apply a desired thickness of paste to wallpaper.

Yet still another object of the present invention is to provide an apparatus for application of paste to wallpaper which is simple to use.

A further object of the present invention is to provide an apparatus for application of paste to wallpaper which is inexpensive to produce.

SUMMARY OF THE INVENTION

Briefly, to achieve the desired objects of the instant invention in accordance with preferred embodiments thereof, provided is a wallpaper preparation device including a tray having a length and defining a reservoir for receiving a fluid for application to wallpaper. A roller having a surface is rotatably carried by the tray and extends into the reservoir. The device further includes a retaining member having opposing ends engagable with engagement features formed in opposing ends of the tray on a first side of the roller. The retaining member extends the length of the tray parallel to the surface of the roller with a gap therebetween, for holding the wallpaper against the roller. The retaining member is adjustable to increase and decrease the gap, thereby decreasing and increasing a frictional force between the wallpaper to be prepared and the roller.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

Figure 1:
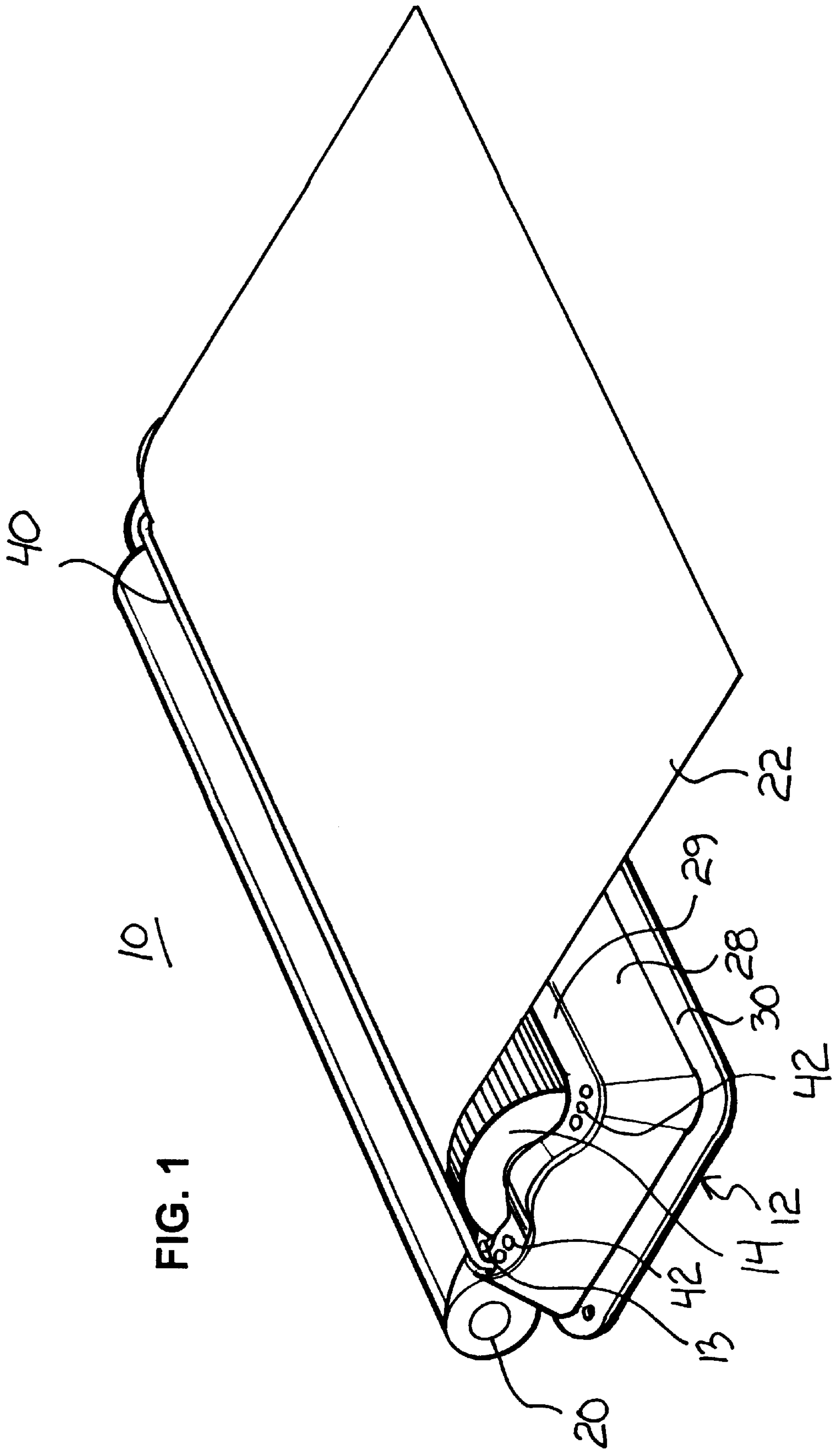
FIG. 1 is a perspective view of a device for preparing wallpaper, according to the present invention.

Turning now to the drawings in which like reference characters indicate corresponding elements throughout the several views, attention is first directed to FIG. 1 which illustrates a wallpaper preparation device 10 including a tray 12 defining a reservoir 13. Tray 12 rotatably carries a roller 14 at least partially extending into reservoir 13. In a preferred embodiment, tray 12 is formed of vacuum molded plastic, and roller 14 is formed of blow molded plastic. The resulting structure is very inexpensive. However, one skilled in the art will realize that other materials and fabrication processes may be employed.

When hanging wallpaper, an adhesive is employed to affix the wallpaper to a wall. The adhesive may be pre-applied and need only be activated, such as by application of water or an activation solution, or the wallpaper may be clean and require the application of an adhesive. Tray 12 is filled or partially filled with water, an adhesive such as paste or an activator which may be a combination of adhesive, depending upon the type of wallpaper being used. A roll 20 of wallpaper 22 is positioned adjacent tray 12 with wallpaper 22 unrolled over roller 14. The solution in tray 12 is picked up by roller 14 and deposited on the back of wallpaper 22 as roller 14 is rotated by wallpaper 22 passing thereover. The surface of roller 14 is preferably textured to hold the solution, and to generate greater friction between roller 14 and wallpaper 22. It is this friction which rotates roller 14.

Figure 2:
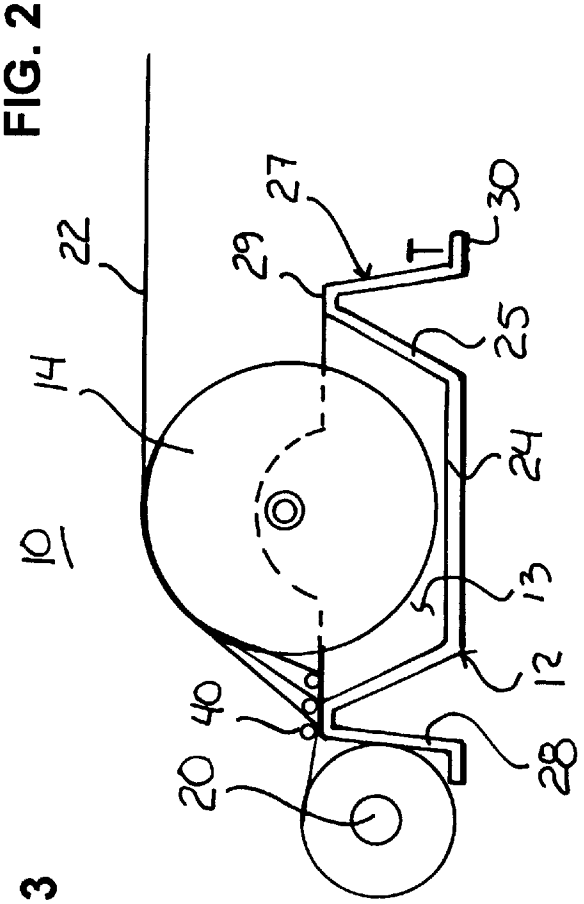
FIG. 2 is a sectional side view of the device of FIG. 1.

Turning now to FIG. 2, tray 12 of device 10 includes a bottom 24, a continuous wall 25 and a supporting structure 27. Wall 25 and bottom 24 define reservoir 13 and retain the solution to be applied, while support structure 27 provides stability to device 10. Support structure 27 can include elements such as legs depending downward from the upper edge of wall 25, or as in the preferred embodiment illustrated, includes a continuous wall 28 extending downward from wall 25 and coupled thereto by a horizontal portion 29 extending between wall 28 and wall 25. Wall 28 terminates in a horizontal flange 30 which allows device 10 to be securely attached to a surface such as a floor or table, by an attachment member such as a tack, nail, screw, pieces of tape, etc.

Figure 3:
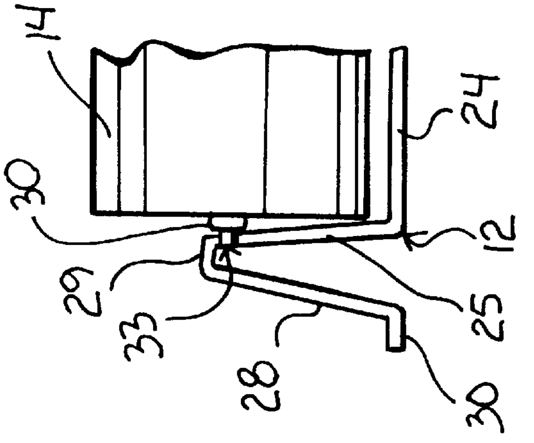
FIG. 3 is a fragmentary sectional view of the device of FIGS. 1 and 2 illustrating the attachment of a roller.

With additional reference to FIG. 3, roller 14 includes a pin 32 extending axial form each opposing end thereof. Opposing apertures 33 are formed in wall 25 at opposing ends of tray 12. Only one end is illustrated since the other is substantially identical. To install roller 14, one end thereof is inserted into reservoir 13 of tray 12 with pin 32 received in aperture 33 formed in wall 25. The length of roller 14 is received within reservoir 13 with pin 32 of the opposing end forced into aperture 33 formed in wall 25 opposite the opposing aperture. The flexibility of tray 12 and wall 25 permits roller 14 to be snapped in place. To aid in insertion of roller 14, a groove may be formed in wall 25 connected to apertures 33.

Figure 4:
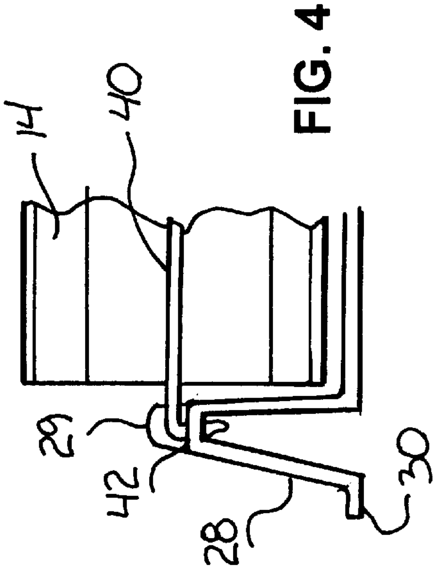
FIG. 4 is a fragmentary sectional view of the device of FIGS. 1 and 2 illustrating attachment of the retaining member.

Referring back to FIGS. 1 and 2, with additional reference to FIG. 4, the amount of solution applied to the back of wallpaper 22 can be controlled by the positioning of a retaining member 40. In the preferred embodiment, retaining member 40 is a generally rigid rod such as a rigid wire which extends the length of tray 12 parallel to the surface of roller 14. It will be understood that other retaining members can be used, such as a simple roller. Retaining member 40 can be coupled to tray 12 in many different ways, such as simply snapping over opposing sides. A lip can be formed over which resilient ends of retaining member would be snapped, and notches can also be included to establish various adjustment positions. However, in the preferred embodiment, apertures 42 are formed in horizontal portion 29 at both ends of tray 12. opposing ends of retaining member 40 are received in aperture 42. A series of apertures 42 can be provided to permit adjustment of retaining member 40 closer to or farther from roller 14. Wallpaper 22 extends from roll 20 under retaining member 40 and over roller 14. As retaining member 40 is positioned increasingly closer to roller 14, the friction between wallpaper 22 and roller 14 will increase. As the friction increases, roller 14 will rotate more and more solution will be picked up and deposited on the back of the wallpaper. At the closest position, roller 14 will rotate at the speed wallpaper 22 is drawn thereover. At the furthest position, the friction between wallpaper 22 and roller 14 is at its lowest. The solution on roller 14 will further reduce the friction. As the paste is depleted on the surface of a portion of the roller, friction will increase, and the roller will rotate until the friction is diminished again. In this manner less solution is deposited. This, however, is generally the case if less viscous solution such as water or activation solution is employed. If a heavy viscous paste is employed, varying the retaining member may have little effect.

Referring specifically to FIG. 1, it can be seen that aperture 42 can be formed in either or both sides of tray 12. If apertures 42 are formed on both sides, the tray is interchangeable. This means wallpaper 22 can be pulled from either direction. This can be helpful when device 10 is fastened to a surface. Instead of having to turn the pasting device around to extract the paper in a different direction, such as toward a different wall, the direction of the extraction is simply reversed.

Figure 5:
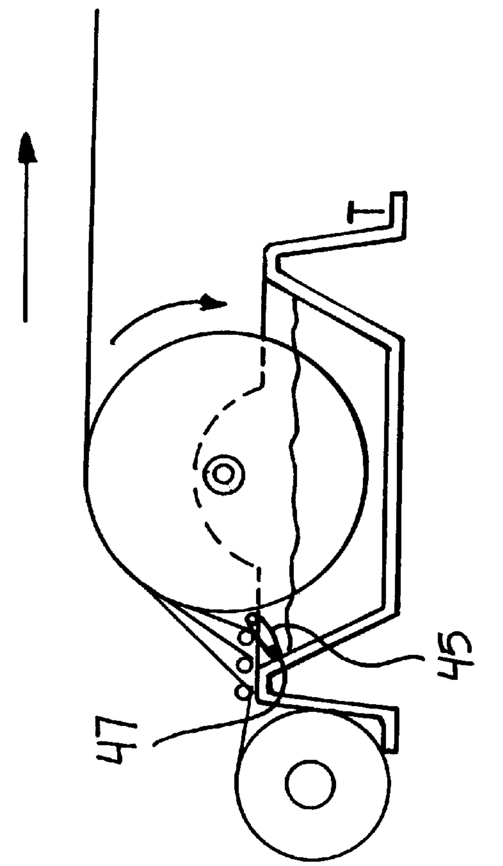
FIG. 5 is a sectional side view of the device of FIG. 1 with the inclusion of a scraper member.
Figure 6:
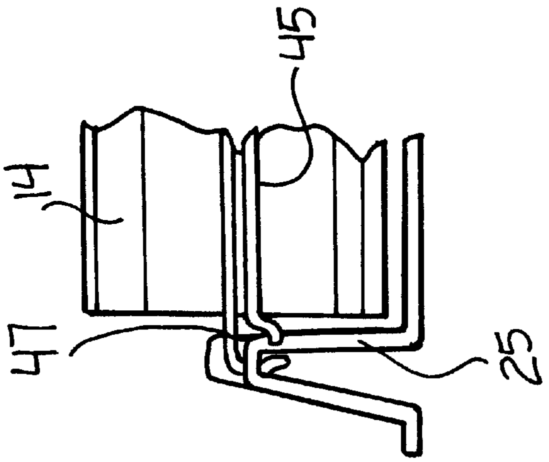
FIG. 6 is a fragmentary sectional view of the device of FIG. 5, illustrating a scraper member.

Turning now to FIGS. 5 and 6, to control the amount of solution applied to the back of the wallpaper when a viscous solution is used, a scraper member 45 is pivotally attached to tray 12 underlying retaining member 40 and attached to wall 24 within reservoir 13. Scraper member 45 has opposing ends 47 which are received in apertures formed in wall 45 and extends adjacent to and parallel roller 14. Scraper member 45 pivots about ends 47 to scrape excess solution of roller 14 when the heavier and more viscous solutions are used.

Figure 7:
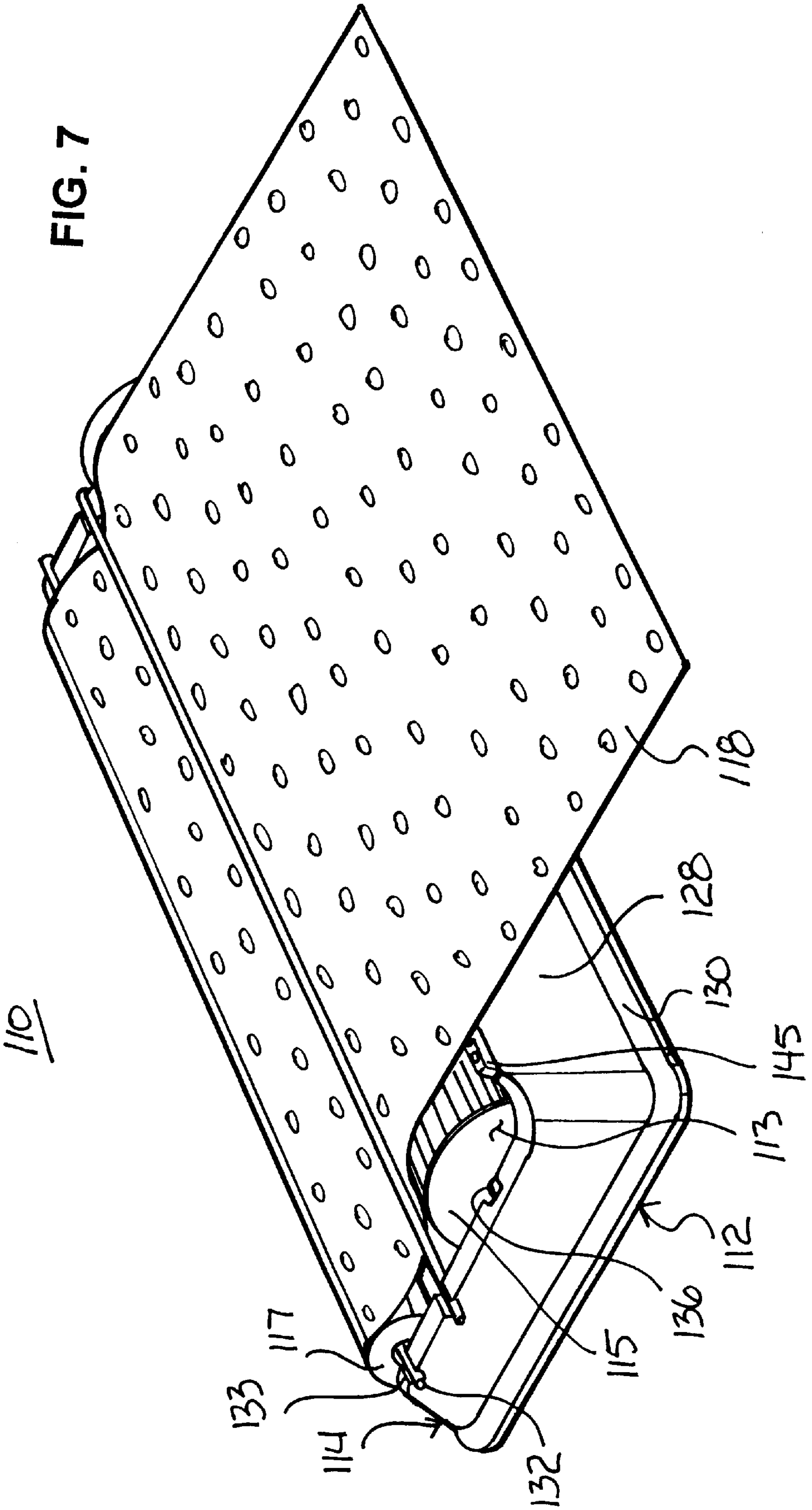
FIG. 7 is a perspective view of a device for preparing wallpaper, according to the present invention.

Turning now to FIG. 7 which illustrates a wallpaper preparation device 110 including a tray 112 defining a reservoir 113 and a roll holder 114. Tray 112 rotatably carries a roller 115 at least partially extending into reservoir 113. Roll holder 114 is adapted to receive a roll 117 of wall paper 118. In a preferred embodiment, tray 112 is formed of vacuum molded plastic, and roller 115 is formed of blow molded plastic. The resulting structure is very inexpensive. However, one skilled in the art will realize that other materials and fabrication processes may be employed.

When hanging wallpaper, an adhesive is employed to affix the wallpaper to a wall. The adhesive may be pre-applied and need only be activated, such as by application of water or an activation solution, or the wallpaper may be clean and require the application of an adhesive. Reservoir 113 of tray 112 is filled or partially filled with water, an adhesive such as paste or an activator which may be a combination of adhesive, depending upon the type of wallpaper being used. Roll 117 of wallpaper 118 is positioned adjacent tray 112 within roll holder 114 with wallpaper 118 unrolled over roller 115. The solution in tray 112 is picked up by roller 115 and deposited on the back of wallpaper 118 as roller 115 is rotated by wallpaper 118 passing thereover. The surface of roller 115 is preferably textured to hold the solution, and to generate greater friction between roller 115 and wallpaper 118. It is this friction which rotates roller 115.

Figure 8:
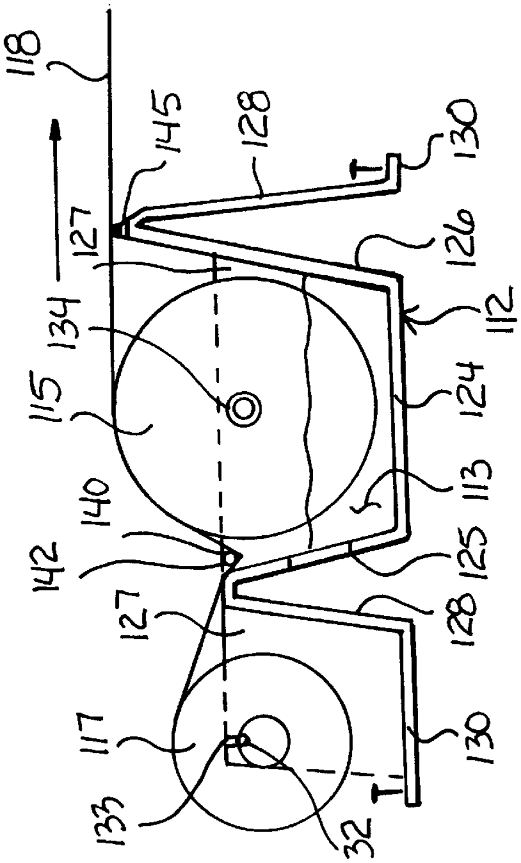
FIG. 8 is a sectional side view of the device of FIG. 7.

With additional reference to FIG. 8, tray 112 of device 110 includes a bottom 124, opposing sidewalls 125 and 126, opposing endwalls 127, and a supporting structure. Walls 125, 126, and 127 and bottom 124 define reservoir 113 and retain the solution to be applied, while the support structure provides stability to device 110. The support structure can include elements such as legs depending downward from the upper edge of walls 125, 126 and 127, or as in the preferred embodiment illustrated, includes a continuous wall 128 extending downward from the upper edge of walls 125, 126 and 127. Wall 128 terminates in a horizontal flange 130 which allows device 110 to be securely attached to a surface such as a floor or table, by an attachment member such as a tack, nail, screw, pieces of tape, etc.

Still referring to FIGS. 7 and 8, endwalls 127 extend outward past sidewall 125. Flange 130 corresponding to sidewall 125 extends outward to the ends of endwalls 127, and forms the bottom for roll holder 114. A support member 132 for receiving and supporting roll 117, extends between endwalls 127. In the preferred embodiment, support member 132 is a generally rigid wire which extends the length of tray 112 parallel to the surface of roller 115. Opposing ends of support member 132 are removably received in snapping engagement with notches 133 formed in the top edge of endwalls 127. Other forms of engagement are contemplated, such as latches, apertures, etc.

Figure 9:
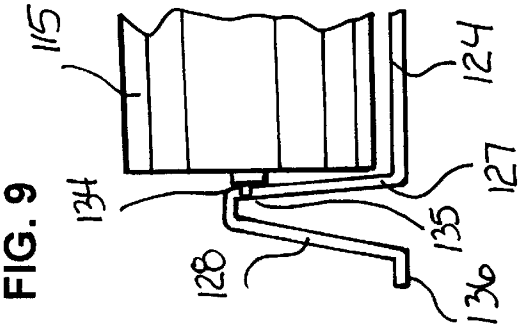
FIG. 9 is a fragmentary sectional view of the device of FIGS. 7 and 8 illustrating the attachment of a roller.

With additional reference to FIG. 9, roller 115 includes a pin 134 extending axial from each opposing end thereof. Opposing apertures 135 are formed in endwalls 127 at opposing ends of tray 112. Only one end is illustrated since the other is substantially identical. To install roller 115, one end thereof is inserted into reservoir 113 of tray 112 with pin 134 received in aperture 135 formed in endwall 127. The length of roller 115 is received within reservoir 113 with pin 134 of the opposing end forced into aperture 133 formed in endwall 127 opposite the opposing aperture. The flexibility of tray 112 and endwall 127 permits roller 115 to be snapped in place. To aid in insertion of roller 115, a groove 136 may be formed in endwall 127 connected to apertures 135.

Figure 10:
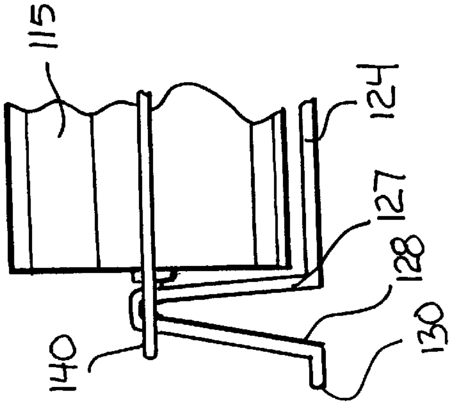
FIG. 10 is a fragmentary sectional view of the device of FIGS. 7 and 8 illustrating attachment of the retaining member.

Referring back to FIGS. 7 and 8, with additional reference to FIG. 10, wallpaper 118 is held in contact with roller 115 by a retaining member 140. In the preferred embodiment, retaining member 140 is a generally rigid wire which extends the length of tray 112 parallel to the surface of roller 115. It will be understood that other retaining members can be used, such as a simple roller. Retaining member 140 can be coupled to tray 112 in many different ways, such as simply snapping over opposing sides. A lip can be formed over which resilient ends of retaining member would be snapped, and notches can also be included. However, in the preferred embodiment, notches 142 are formed in the upper edges of endwalls 127 between sidewall 125 and roller 115. Opposing ends of retaining member 140 are received in notches 142. Wallpaper 118 extends from roll 117 under retaining member 140 and over roller 115.

Figure 11:
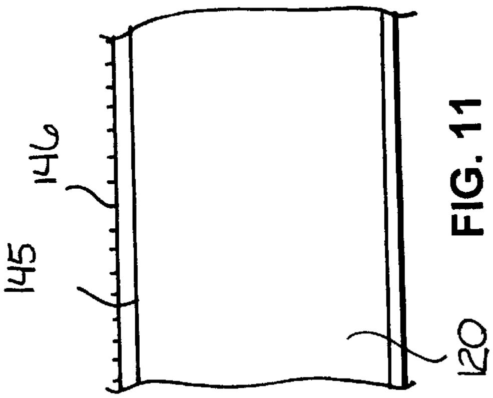
FIG. 11 is a fragmentary sectional view of the device of FIGS. 7 and 8 illustrating the scraper member.

Referring back to FIGS. 7 and 8, with additional reference to FIG. 11, the amount of solution on the back of wallpaper 118 is controlled by a scraper member 145 integrally formed at the top edge of sidewall 126. Sidewall 126 extends upwardly past endwalls 127 and sidewall 125 to a point substantially level with the upper surface of roller 115. After wallpaper 118 is pulled over roller 115, it slides over scraper member 145. As can be seen in FIG. 11, scraper member 145 includes a plurality of raised elements 146 evenly spaced along the length thereof and separated by channels. Raised elements 146 of scraper member 145 scrape excess solution off paper 118, and are especially useful when the heavier and more viscous solutions are used.

Figure 12:
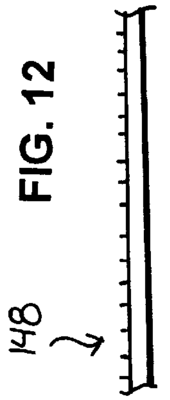
FIG. 12 is a fragmentary view of an additional scraper member.
Figure 13:
FIG. 13 is a cross sectional end view of the additional scraper member of FIG. 12.

Referring now to FIGS. 12 and 13, an additional scraper member 148 can be snapped on over the upper edge of sidewall 126 if integral scraper member 145 is not formed of the appropriate channel width and element depth. In this case, scraper member 148 includes a channel 149 sized to receive scraper member 145 therein. It will be understood that additional scraper members can be utilized each having differing scraping characteristics.

Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A wallpaper preparation device comprising:

a tray including a reservoir for holding fluid for application to wallpaper, the reservoir defined by a continuous sidewall having a closed end and an open end defined by a continuous upper edge;

a roller rotatably carried by the tray, the roller having a surface and extending into the reservoir; and a portion of the continuous upper edge of the reservoir including a scraper member for removing fluid from the wallpaper.

2. A device as claimed in claim 1 wherein the reservoir includes a length and the scraper member extends along substantially the entire length of the reservoir.

3. A device as claimed in claim 1 wherein the scraper member is integrally formed with the portion of the continuous upper edge of the reservoir.

4. A device as claimed in claim 1 wherein the scraper member includes a plurality of raised elements separated by channels.

5. A device as claimed in claim 1 wherein the scraper member is removable from the portion of the continuous upper edge of the reservoir.

6. A device as claimed in claim 1 further including an additional scraper member detachably engagable with the scraper member.

7. A device as claimed in claim 6 wherein the additional scraper member includes a plurality of raised elements separated by channels.

8. A wallpaper preparation device comprising:

a tray having a length and including a reservoir for holding fluid for application to wallpaper, the reservoir defined by a continuous sidewall having a closed end and an open end defined by a continuous upper edge;

a roller rotatably carried by the tray, the roller having a first side, a second side, a surface and extending into the reservoir;

a retaining member carried by the tray adjacent one of the first and second sides of the roller and extending along substantially the entire length of the tray substantially parallel to the surface of the roller with a gap therebetween, the retaining member for holding the wallpaper against the roller; and a portion of the continuous upper edge of the reservoir adjacent the other of the first and second sides of the roller including a scraper member for removing fluid from the wallpaper.

9. A device as claimed in claim 8 wherein the scraper member extends along substantially the entire length of the tray.

10. A device as claimed in claim 8 wherein the scraper member is integrally formed with the portion of the continuous upper edge of the reservoir.

11. A device as claimed in claim 8 wherein the scraper member includes a plurality of raised elements evenly spaced along a length thereof and separated by channels.

12. A device as claimed in claim 8 wherein the scraper member is removable from the portion of the continuous upper edge of the reservoir.

13. A device as claimed in claim 8 further including an additional scraper member detachably engagable with the scraper member.

* * * * *